(12) United States Patent
Modrzejewski et al.

(10) Patent No.: US 10,549,849 B1
(45) Date of Patent: Feb. 4, 2020

(54) VARIABLE HUB-TO-HUB PHASING ROTOR SYSTEM

(71) Applicant: BELL HELICOPTER TEXTRON INC., Fort Worth, TX (US)

(72) Inventors: Brian Modrzejewski, Keller, TX (US); Ken Shundo, Keller, TX (US); Frank B. Stamps, Colleyville, TX (US); David Popelka, Colleyville, TX (US); J. Scott Drennan, Dallas, TX (US); Michael E. Rinehart, Euless, TX (US)

(*) Notice: Subject to any disclaimer, the term of this patent is extended or adjusted under 35 U.S.C. 154(b) by 0 days.

(21) Appl. No.: 15/895,589

(22) Filed: Feb. 13, 2018

Related U.S. Application Data

(62) Division of application No. 14/174,004, filed on Feb. 6, 2014, now Pat. No. 9,889,927.

(51) Int. Cl.
| | | |
|---|---|---|
| *B64C 27/00* | (2006.01) | |
| *F16F 15/22* | (2006.01) | |
| *B64C 11/50* | (2006.01) | |
| *G10K 11/178* | (2006.01) | |
| *B64C 27/30* | (2006.01) | |

(52) U.S. Cl.
CPC ............ *B64C 27/001* (2013.01); *B64C 11/50* (2013.01); *G10K 11/178* (2013.01); *B64C 27/30* (2013.01); *B64C 2027/004* (2013.01); *G10K 2210/123* (2013.01); *G10K 2210/1281* (2013.01)

(58) Field of Classification Search
CPC . B64C 27/001; B64C 11/50; B64C 2027/004; B64C 27/30; G10K 11/178; G10K 2210/123; G10K 2210/1281
See application file for complete search history.

(56) References Cited

U.S. PATENT DOCUMENTS

| | | |
|---|---|---|
| 5,148,402 A | 9/1992 | Magliozzi |
| 5,715,162 A | 2/1998 | Daigle |
| 8,201,772 B2 | 6/2012 | Wendelsdorf et al. |
| 2010/0272571 A1 | 10/2010 | Yonge |

FOREIGN PATENT DOCUMENTS

| | | |
|---|---|---|
| EP | 0663337 A1 | 7/1995 |
| EP | 2132090 A1 | 12/2009 |
| JP | 59220622 A | 5/1986 |
| WO | 9522488 A1 | 8/1995 |

OTHER PUBLICATIONS

Search Report Office Action dated Aug. 28, 2014 from counterpart EP App. No. 14157931.8.
Office Action dated Sep. 16, 2014 from counterpart EP App. No. 14157931.8.
Amendment dated Jan. 23, 2017 from counterpart U.S. Appl. No. 14/174,004.

(Continued)

*Primary Examiner* — John C Hong
(74) *Attorney, Agent, or Firm* — James E. Walton

(57) ABSTRACT

An aircraft includes a first rotor assembly, a second rotor assembly, and a rotor phase angle control system. The system includes a phase adjustor operably associated with the first rotor assembly and the second rotor assembly. The method includes sensing vibrations exerted on the aircraft and offsetting a phase angle of the first rotor assembly and the second rotor assembly to minimize the vibrations.

3 Claims, 2 Drawing Sheets

(56) References Cited

OTHER PUBLICATIONS

Amendment dated Aug. 3, 2017 from counterpart U.S. Appl. No. 14/174,004.
Restriction Requirement dated Aug. 3, 2016 from counterpart U.S. Appl. No. 14/174,004.
Office Action dated Oct. 20, 2016 from counterpart U.S. Appl. No. 14/174,004.
Office Action dated May 3, 2017 from counterpart U.S. Appl. No. 14/174,004.
Notice of Allowance dated Oct. 4, 2017 from counterpart U.S. Appl. No. 14/174,004.
Office Action dated Mar. 4, 2015 from counterpart EP App. No. 14157931.8.

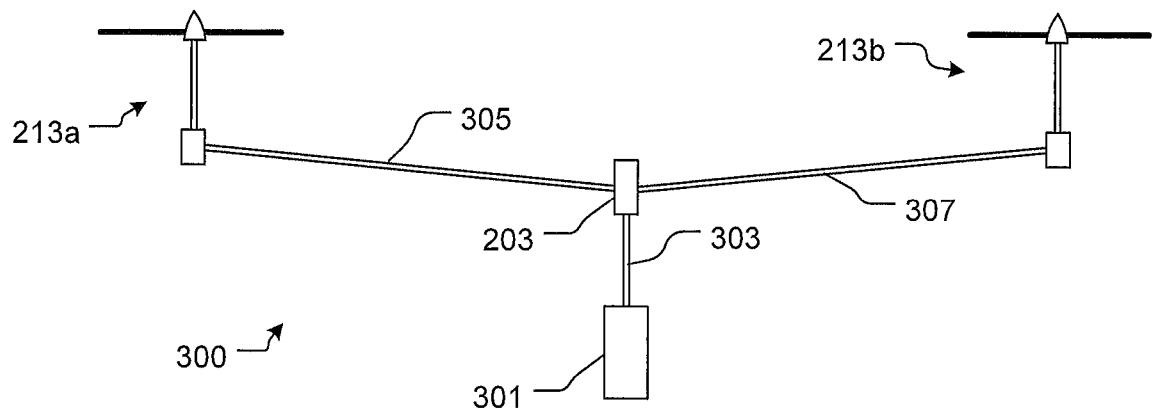
FIG. 3
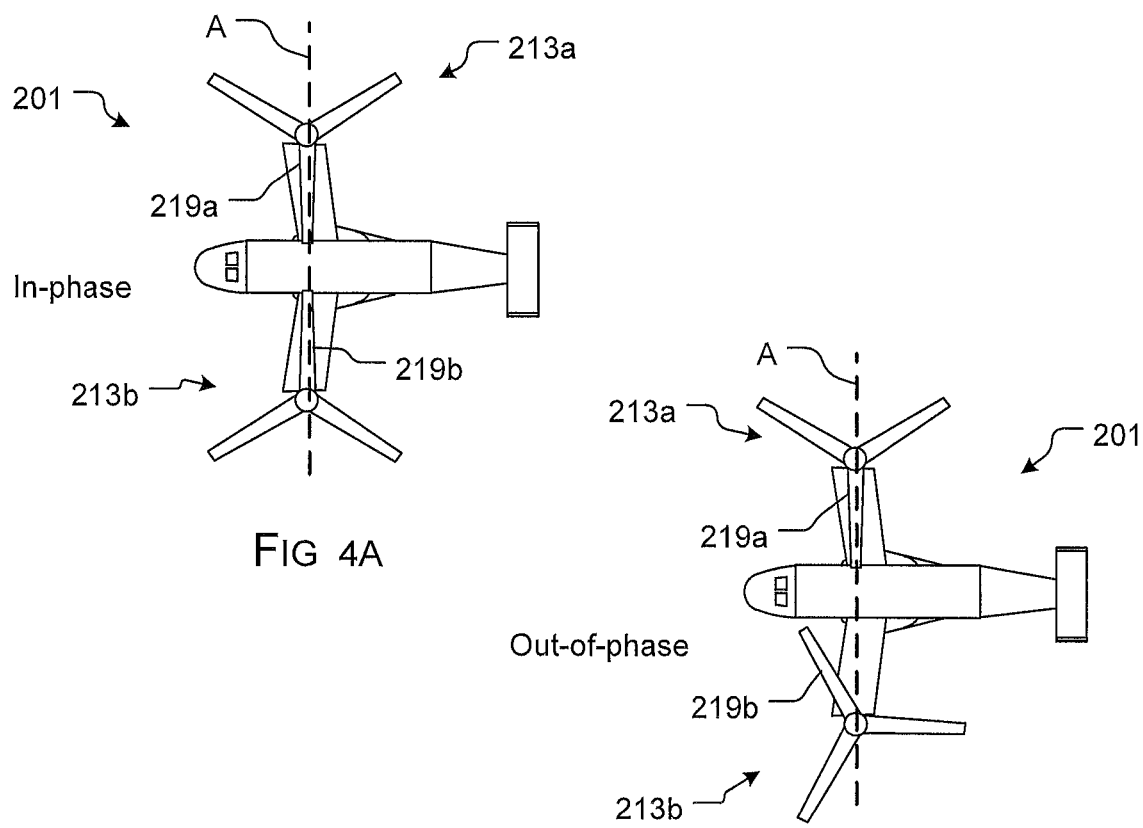
FIG 4A
FIG. 4B

VARIABLE HUB-TO-HUB PHASING ROTOR SYSTEM

BACKGROUND

1. Field of the Invention

The present application relates generally to systems operably associated with aircraft rotor phasing, and more specifically, to a system configured to provide real-time rotor phasing during flight.

2. Description of Related Art

The process of phasing two or more rotor blade assemblies relative to each other is well known in the art. Phasing is an effective method to control vibrations exerted on the aircraft during flight. Conventional phasing methods include the process of determining optimal offset positions of the rotor blades prior to flight, then retaining the rotor blades in the offset positions during flight. The pre-flight phasing process has shown to be an effective method to control vibrations during flight. Without proper phasing, vibrations on the aircraft create an uncomfortable ride, and in some cases, could cause catastrophic failure to the aircraft.

Although the foregoing pre-flight phasing methods have shown to be effective, it should be understood that the preset phasing is not ideal for all flight conditions. For example, the aircraft performs differently than the maiden flight and/or the aircraft is required to perform under various flight conditions, e.g., bad weather conditions and/or heavier/lighter payloads. Conventional pre-flight phasing methods are thus limited in view of the foregoing scenarios.

Although the foregoing developments in the field of phasing multiple rotor blade assemblies relative to each other represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 3 is a simplified schematic of the phase angle adjustment system associated with the rotor assemblies of the tiltrotor aircraft of FIG. 2; and FIGS. 4A and 4B are top views of the tiltrotor aircraft of FIG. 2.

Figure 1:
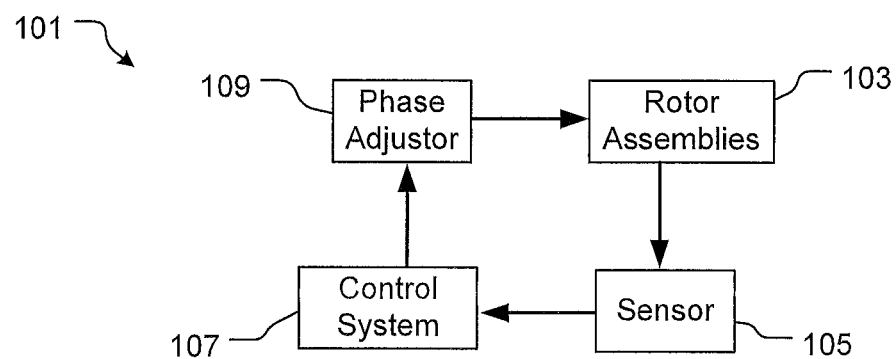
FIG. 1 is a simplified schematic of a method pursuant to a preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes the abovementioned problems commonly associated with conventional systems and methods to control vibrations via phasing rotor assemblies. Specifically, the system of the present application includes a phase angle adjustment system having a phase adjustor operably associated with two or more rotor assemblies. The phase adjustor is configured to phase the rotor assemblies relative to each other during flight such that the rotor blades become offset at desired angles relative to each other, thereby eliminating vibrations exerted on the aircraft via the rotor assemblies. The vibrations are continuously monitored via phase angle adjustment system, which in turn allows real-time adjustment of the rotor assemblies during flight. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts a phasing process 101 in accordance with a preferred method of the present application. As shown, a rotor assembly 103 is operably associated with one or more sensors 105, wherein the sensors are configured to sense vibrations exerted on the aircraft via the two or more rotor assemblies 103. The sensed vibrations are relayed to a control system 107 that includes the necessary hardware, software, algorithms and the like to determine the required phasing of the rotor blades of the rotor assemblies relative to each other so as to minimize the vibrations. The control system 107 then commands a phase adjustor 109, which in turn adjusts the angle orientation of the rotor blades relative to each other. This process is continuously repeated during flight such that optimal flight conditions are achieved. These features provide significant advantages, namely, the process allows for real-time monitoring and phase adjustment of the rotor assemblies during flight, thereby enabling vibration control with changes in flight conditions, e.g., changes in weather and/or payload.

Figure 2:
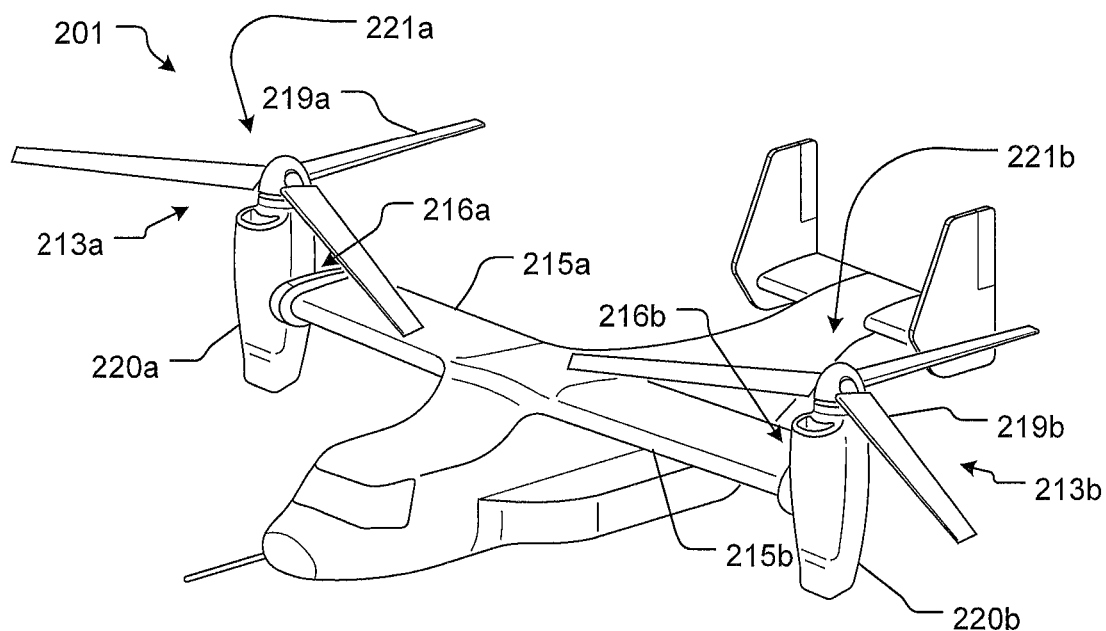
FIG. 2 is a perspective view of a tiltrotor aircraft according to a preferred embodiment of the present application, which utilizes the method of FIG. 1.

Referring now to FIG. 2 in the drawings, an oblique view of a tiltrotor aircraft 201 is shown utilizing the phasing process 101 discussed above. In the exemplary embodiment, tiltrotor aircraft 201 includes rotor assemblies 213a and 213b that are carried by wings 215a and 215b, and are disposed at end portions 216a and 216b of wings 215a and 215b, respectively. Tilt rotor assemblies 213a and 213b include nacelles 220a and 220b, which carry the engines and transmissions of tilt rotor aircraft 201, as well as, rotor proprotors 219a and 219b on forward ends 221a and 221b of tilt rotor assemblies 213a and 213b, respectively. Tilt rotor assemblies 213a and 213b move or rotate relative to wing members 215a and 215b between a helicopter mode in which tilt rotor assemblies 213a and 213b are tilted upward, such that tilt rotor aircraft 201 flies like a conventional helicopter; and an airplane mode in which tilt rotor assemblies 213a and 213b are tilted forward, such that tilt rotor aircraft 201 flies like a conventional propeller driven aircraft.

Although shown utilized with a tiltrotor aircraft with rotor blades that rotate on the same plane, it will be appreciated that the features discussed herein could also be incorporated with any type of aircraft having two or more rotor assemblies that rotate relative to each other and exert vibrations on a fuselage. For example, in one contemplated embodiment, the aircraft could include two rotor assemblies that are not adapted to pivot like a tiltrotor aircraft, but nonetheless include two or more rotor blades that rotate relative to each other, resulting in vibrations on the aircraft.

FIG. 3 is a top cutout view of a rotor phase angle control system 300 utilized by aircraft 201 and incorporates the features of process 101. As shown, the rotor phase angle control system 300 is shown operably associated with one or more of the features of aircraft 201. For simplicity of illustration, FIG. 3 is shown without all the features of aircraft 201. In the preferred embodiment, system 300 includes the phase adjustor 203 that is driven by the aircraft engine 301 via an input drive shaft 303. The phase adjustor 203 is configured to receive the input shaft 303 and transfer the rotational movement thereof to drive the rotor assemblies 213a, 213b via respective output drive shafts 305, 307 the extend through respective wings 215a, 215b of aircraft 201.

In the contemplated embodiment, the phase adjustor 203 is configured to selectively control the rotational movement of shafts 305, 307. Thus, phase adjustor 203 is adapted to adjustably offset the rotational movement output shafts 305, 307 relative to each other, which in turn offsets the blade positions of the rotors of the rotor assemblies 213a, 213b relative to each other.

In the preferred embodiment, phase adjustor 203 is a clutch configured to perform these features. Specifically, the clutch is configured to connect and disconnect the output shafts 305, 307 for a predetermined time, thereby allowing the offset of the rotor blades to occur. In alternative embodiments, phase adjustor 203 can include other devices substantially similar in function.

FIGS. 4A and 4B are top views of aircraft 201 that illustrate the foregoing discussed method of phasing the two rotor assemblies relative to each other. In FIG. 4A, the longitudinal lengths of the rotor blades 219a, 219b are aligned with each other along axis A, thus the rotor assemblies are considered to be in-phase with each other. In FIG. 4B, the control system commands the phase adjustor to offset the rotor blades at a predetermined angle relative to each other, thereby rendering the rotor blades offset from each other and the rotor assemblies out-of-phase with each other. To achieve these features, the aircraft 201 utilizes the system and methods discussed above.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method, comprising:
   sensing vibrations exerted on an aircraft via two or more rotor assemblies during flight; and
   offsetting a phase angle of the two or more rotor assemblies with a phase adjustor to minimize the vibrations;
   wherein the process of sensing and the process of offsetting are achieved in real-time during flight;
   wherein a first rotor assembly of the two or more rotor assemblies is operably associated with a first shaft, and a second rotor assembly of the two or more rotor assemblies is operably associated with a second shaft; and
   wherein the phase adjustor is a clutch configured to disengage and reengage with the first shaft and the second shaft.

2. The method of claim 1, further comprising:
   relaying the sensed vibration to a control system operably associated with the phase adjustor; and
   commanding the phase adjustor via the control system to adjust the phase angle of the two or more rotor assemblies.

3. The method of claim 1, further comprising:
   disengaging and reengaging the first shaft via the phase adjustor;
   wherein the disengaging and reengaging the first shaft causes the first rotor assembly to offset from the second rotor assembly, thereby creating the phase angle between the two rotor assemblies.

* * * * *